(12) United States Patent
Loucks

(10) Patent No.: US 7,094,443 B2
(45) Date of Patent: Aug. 22, 2006

(54) SOLID POLYMERIC PRODUCTS FOR MINIMIZING SPRINKLER WHEEL TRACK RUTS

(76) Inventor: John Kevin Loucks, 4725 Crest Rd., Fort Collins, CO (US) 80526

( * ) Notice: Subject to any disclaimer, the term of this patent is extended or adjusted under 35 U.S.C. 154(b) by 655 days.

(21) Appl. No.: 10/274,936

(22) Filed: Oct. 21, 2002

(65) Prior Publication Data

US 2004/0074990 A1    Apr. 22, 2004

(51) Int. Cl.
*B05C 1/16* (2006.01)
*B05D 1/02* (2006.01)
(52) U.S. Cl. ........................ 427/136; 427/421
(58) Field of Classification Search ................ 427/136, 427/421, 426, 420; 405/52, 73, 74, 258.1, 405/264, 263
See application file for complete search history.

(56) References Cited

U.S. PATENT DOCUMENTS

2002/0157141 A1 * 10/2002 Pangratz ..................... 800/298

* cited by examiner

*Primary Examiner*—Timothy Meeks
*Assistant Examiner*—Eric B. Fuller

(57) ABSTRACT

Wheel track ruts form under moving sprinklers and the depth of ruts is reduced and water infiltration is increased by using solid polymeric products. Solid polymeric products containing water soluble polymer are located over each wheel track. Sprinkler water contacts and dissolves the solid polymeric products, carrying water soluble polymer into the wheel track.

12 Claims, No Drawings

SOLID POLYMERIC PRODUCTS FOR MINIMIZING SPRINKLER WHEEL TRACK RUTS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND OF THE INVENTION

The primary purpose for development of this invention is to provide a cost effective method of minimizing agricultural sprinkler wheel track ruts. It relates to stabilizing soil structure with water soluble polymer. Center-pivot sprinklers and linear movement sprinklers use large wheels to enable movement through an irrigated field. There are generally one or more support towers on these sprinkler systems. Each tower generally has two tires, one trailing the other. Due to the weight of the overhead sprinkler system and the softness of the wet ground the wheel tracks can become deep ruts, occasionally causing the sprinkler system to get stuck.

In the past, irrigators learned to live with the problem. They would purchase special wheels (see U.S. Pat. No. 5,046,785) to prevent them from getting stuck in the deep ruts, or they would fill in the ruts during the irrigation season (see U.S. Pat. Nos. 6,386,792 and 4,909,334). Another option has been to move the sprinkler heads behind the trailing wheel (see U.S. Pat. No. 6,116,527), allowing the wheels to travel on drier ground.

Irrigators have begun using water soluble polymers for soil stabilization. Until now, they have generally been applied to irrigation water for erosion control and to improve water penetration. Liquid polymers are being injected into sprinkler irrigations systems (see U.S. Pat. No. 6,000,625) to stabilize soil structure and improve water penetration. While this method begins to stabilize soil throughout the field, it does not provide enough water soluble polymer in the wheel tracks to reduce rutting. Also, from a cost perspective, water soluble polymer is spread over the entire field instead of only in the wheel tracks.

Granular and solid polymeric products (i.e. blocks, tablets, or gel logs) have been placed in furrows for erosion control and for improving water infiltration during gravity irrigation (see U.S. Pat. No. 5,749,672). However, prior to this invention, solid polymeric products had not been developed or used for stabilizing sprinkler wheel tracks.

BRIEF SUMMARY OF THE INVENTION

This invention consists of solid polymeric products traveling with the sprinkler, releasing water soluble polymer into the wheel tracks as they dissolve. The preferred embodiment uses anionic polyacrylamide with charge density ranging from low to high and molecular weights ranging from medium to very high. However, cationic or nonionic polyacrylamide products with varying charge densities and with molecular weights varying from low to very high may be used with some degree of success.

The solid polymeric products should be located directly over the wheel track or incorporate the use of a mechanism to direct the dissolved polymer flow into the wheel track. The solid polymeric products must have water flowing onto them to allow the dissolution process to take place. These solid polymeric products should be made with a rope or other hanging device to hang them. Or, they should be placed in a porous container (i.e. wire cage, porous sack, or net) and attached the center pivot with or without a hanging device.

Depending upon the water temperature and irrigation practices, the polymeric products may need to be reapplied during the growing season. When the solid polymeric products and dissolved, more polymeric products should be added. The preferred embodiment indicates refilling each sack or container with the amount initially recommended or determined to be successful. Alternatively, a lesser amount of polymeric products may be used for refilling later in the irrigation season.

This invention is much less expensive and more effective than previous methods used to control rut depth or keep sprinklers from getting stuck. As an example, special tires or tire covers are very expensive and they do not always produce the desired results. This invention is less than 5% of the cost and is very effective. Injecting water soluble polymer into the sprinkler system costs 5 to 10 times more than the cost of this invention and does an inadequate job of controlling wheel track ruts. This invention works very well for controlling wheel track ruts.

This invention reduces wheel track erosion, stabilizes the wheel track against deep ruts due to the weight of the sprinkler system, and helps reduce the amount of standing water in the wheel track. By removing standing in the wheel tracks, the ground in the wheel track is drier during each sprinkler application. Moving across drier ground dramatically reduces rutting potential.

BRIEF DESCRIPTION OF THE SEVERAL VIEWS OF THE DRAWING

Not Applicable

DETAILED DESCRIPTION OF THE INVENTION

This invention is intended to be attached to center pivot irrigation systems and linear movement irrigation systems. In the preferred embodiment, approximately one pound of active water soluble polymer (preferably very high molecular weight anionic polyacrylamide with a charge density between 5% and 35%) is used to treat 3,000 linear feet of wheel track length. This number may range from less than 1000 feet to over 10,000 feet per pound of active water soluble polymer depending upon desired results, water flow, droplet size, soil type, and length of treatment period desired.

In a preferred embodiment, water soluble solid polymeric products containing polyacrylamide are placed directly over the wheel tracks and in good sprinkler water flow. The preferred embodiment includes solid polymeric products placed in a porous sack. The sack should not inhibit water flow to the solid polymeric products, should allow for drainage into the wheel track below, and should hold the solid polymeric products in place. The sack should be hung from the sprinkler system frame in the location described above. In the preferred embodiment, the sack hangs from the cross member or from the motor on the sprinkler tower.

The preferred embodiment includes a short rope attaching the sack to a part of the frame near the ground to minimize sack movement caused by wind. Keeping the bottom of the sack less than 12 inches from the ground will minimize the potential of the polymer stream blowing to locations outside of the wheel track.

For the greatest benefit, these polymeric products should be applied during the first irrigation of the season. If applied later in the season, ruts may have already begun to form. There may still be advantages to using this invention later in the season, but the benefits will not be as great.

What I claim as my invention is:

1. A method of applying water soluble polymer to sprinkler wheel tracks in which solid polymeric products are attached to the outside of a moving sprinkler system and travel with the moving sprinkler system and in which sprinkler water leaving the sprinkler dissolves and activates the solid polymeric products, continuously dribbling liquid polymer solution along the length of the wheel tracks.

2. A method according to claim 1 in which the solid polymeric product is one or more blocks consisting of water soluble polymer in a water soluble or water dispersible wax matrix.

3. A method according to claim 1 in which the solid polymeric product is one or more tablets (or other molded shapes) consisting of water soluble polymer pressed together with other constituents, some of which help hold the tablets together or aid in the dissolution process.

4. A method according to claim 1 in which the solid polymeric product is in gel form.

5. A method according to claim 1 in which the solid polymeric products are suspended by a rope or other hanging device that is pressed or molded into or around the solid polymeric product.

6. A method according to claim 1 in which the solid polymeric products are placed in a porous sack or net and directly tied to or hung from the sprinkler, or attached to the sprinkler with a rope or other hanging device.

7. A method according to claim 1 in which the solid polymeric products are placed in wire (or other material of construction) cages mounted to the sprinkler or suspended with a hanging device.

8. A method according to claim 1 in which the solid polymeric products are suspended from or attached to an exterior support system fixed to the sprinkler frame.

9. A method according to claim 1 in which the solid polymeric products are located directly over the sprinkler track.

10. A method according to claim 1 in which the solid polymeric products are not located directly over the sprinkler track and the dissolved polymer solution flows to the wheel track in a trough, pipe or similar flow delivery device.

11. A method according to claim 1 in which water comes from sprinkler nozzles to dissolve the solid polymeric products.

12. A method according to claim 1 in which tubes or pipes deliver water to dissolve the solid polymeric products.

* * * * *